US008260488B2

(12) United States Patent
Ishikawa et al.

(10) Patent No.: US 8,260,488 B2
(45) Date of Patent: Sep. 4, 2012

(54) ABNORMALITY ANALYSIS SYSTEM FOR VEHICLE AND ABNORMALITY ANALYSIS METHOD FOR VEHICLE

(75) Inventors: Tomoyasu Ishikawa, Nagoya (JP); Toshiyuki Abe, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 478 days.

(21) Appl. No.: 12/543,902

(22) Filed: Aug. 19, 2009

(65) Prior Publication Data

US 2010/0057292 A1 Mar. 4, 2010

(30) Foreign Application Priority Data

Aug. 29, 2008 (JP) ................................ 2008-222459

(51) Int. Cl.
*G01M 17/00* (2006.01)
*G06F 7/00* (2006.01)
*G06F 19/00* (2011.01)

(52) U.S. Cl. ..................... 701/31.8; 701/29.1; 701/33.4; 702/183; 702/185

(58) Field of Classification Search .................... 701/29, 701/29.1, 29.6, 29.9, 30.8, 31.4, 31.6, 31.7, 701/31.8, 31.9, 33.2, 33.4; 702/183, 184, 702/185

See application file for complete search history.

(56) References Cited

U.S. PATENT DOCUMENTS 7,765,039 B1 * 7/2010 Hagenbuch .................. 701/32.2
7,865,278 B2 * 1/2011 Underdal et al. ............ 701/31.8
2007/0294001 A1 * 12/2007 Underdal et al. ............... 701/29

FOREIGN PATENT DOCUMENTS

| | | | |
|---|---|---|---|
| JP | 6-160245 | A | 6/1994 |
| JP | 09-032039 | A | 2/1997 |
| JP | 9-120312 | A | 5/1997 |
| JP | 2842922 | B2 | 10/1998 |
| JP | 11-119823 | A | 4/1999 |
| JP | 2001-202125 | A | 7/2001 |
| JP | 2002-236690 | A | 8/2002 |
| JP | 2003-316423 | A | 11/2003 |
| JP | 2004-13138 | A | 1/2004 |
| JP | 2005-43138 | A | 2/2005 |

(Continued)

OTHER PUBLICATIONS

English Translation JP2006251918A.*

(Continued)

*Primary Examiner* — Thomas H. Tarcza
*Assistant Examiner* — Rami Khatib
(74) *Attorney, Agent, or Firm* — Sughrue Mion, PLLC

(57) ABSTRACT

When an abnormality of a vehicle is detected based on a vehicle state value that indicates the vehicle state, an abnormality analysis system for the vehicle estimates a cause of the abnormality. The abnormality analysis system includes: a factor identifying information extraction unit that extracts factor identifying information which is used to identify a factor of the abnormality based on the vehicle state value; a database that contains data groups which correspond to respective categories of the factor identifying information and which store causes of abnormalities and vehicle state values at the time of occurrence of the abnormalities; and an abnormality cause estimation unit that executes a process for estimating the cause of the abnormality of the vehicle with the use of the data group that corresponds to the category of the factor identifying information extracted by the factor identifying information extraction unit.

14 Claims, 7 Drawing Sheets

FOREIGN PATENT DOCUMENTS

| | | | |
|---|---|---|---|
| JP | 2005-263196 | A | 9/2005 |
| JP | 2006-53016 | A | 2/2006 |
| JP | 2006-251918 | A | 9/2006 |

OTHER PUBLICATIONS

Japanese Office Action dated May 25, 2010, issued in Japanese Application No. 2008-222459 (with translation) (4 pages).

Japanese Office Action issued on Sep. 14, 2010 for corresponding Japanese Patent Application No. 2008-222459.

Japanese Office Action issued on Feb. 15, 2011 for corresponding Japanese Patent Application No. 2008-222459, Partial English-language translation.

Chinese Office Action dated Dec. 23, 2010 issued in Japanese Application No. 2009-10166811.8 (with translation of 5 pages).

* cited by examiner

FIG. 2A

DATA MINING IN VEHICLE

CLASSIFY CONTROL VALUES IN ALL SYSTEMS IN VEHICLE, BASED ON WHICH ABNORMALITY FACTORS OTHER THAN MALFUNCTION ARE IDENTIFIED, INTO FACTOR IDENTIFYING INFORMATION CATEGORIES A, B, C AND D

| FACTOR IDENTIFYING INFORMATION CATEGORY A (OPERATION SYSTEM/INPUT SENSOR SYSTEM INFORMATION) | FACTOR IDENTIFYING INFORMATION CATEGORY B (TRAVELING STATE INFORMATION) | FACTOR IDENTIFYING INFORMATION CATEGORY C (SYSTEM INFORMATION) | FACTOR IDENTIFYING INFORMATION CATEGORY D (CORRECTION/LEARNING STATE) |
|---|---|---|---|
| DOOR SWITCH STATE | ACCELERATION | POWER SUPPLY VOLTAGE | CONTROL LEARNED VALUE |
| MIRROR SWITCH STATE | VEHICLE SPEED | ELECTRIC LOAD VALUE | ZERO-POINT CORRECTION VALUE |
| LOCK SWITCH STATE | ENGINE SPEED | MICROCOMPUTER STATE | LENS LEARNED VALUE |
| ELECTRIC SEAT SWITCH STATE | TRANSMISSION SHIFT STATE | etc. | STEERING CORRECTION VALUE |
| LAMP SWITCH STATE | INJECTION STATE | | ACCELERATION CORRECTION VALUE |
| CRUISE SWITCH STATE | etc. | | ACCELERATOR SENSOR LEARNED VALUE |
| STEERING STATE | ROAD INFORMATION | | etc. |
| TRANSMISSION LEVER STATE | WEATHER INFORMATION | | |
| BRAKE PEDAL STATE | | | |
| ACCELERATOR PEDAL STATE | | | |
| PARKING BRAKE STATE | | | |
| etc. | | | |

FIG. 4

EXAMPLE OF TRAINING DATA

| | ESTIMATED FACTOR | ESTIMATION RESULT (LEARNED VALUE) - FFD | | | | |
|---|---|---|---|---|---|---|
| 26 | MALFUNCTION | MALFUNCTION OF SENSOR | WIRE BREAKAGE IN SWITCH | MALFUNCTION OF ACTUATOR | MALFUNCTION OF SYSTEM | etc. |
| 21 | TEMPORARY ABNORMALITY DUE TO OPERATION BY USER | STEERING WHEEL IS ROTATED BY MAXIMUM AMOUNT WHILE VEHICLE DOES NOT TRAVEL | OPERATION FOR APPLYING BRAKES SUDDENLY | etc. | | |
| 22 | TEMPORARY ABNORMALITY DUE TO TRAVELING STATE | VEHICLE TRAVELS ON BUMPY ROAD | VEHICLE SKIDS | etc. | | |
| 24 | TEMPORARY ABNORMALITY DUE TO PROCESSING LOAD | Q-CPU LOAD | R-ECU LOAD | etc. | | |
| 23 | TEMPORARY ABNORMALITY DUE TO DETERIORATION OF COMPONENT | DETERIORATION OF COMPONENT Z | DETERIORATION OF SWITCH Y | etc. | | |
| | etc. | | | etc. | | |

ABNORMALITY ANALYSIS SYSTEM FOR VEHICLE AND ABNORMALITY ANALYSIS METHOD FOR VEHICLE

INCORPORATION BY REFERENCE

The disclosure of Japanese Patent Application No. 2008-222459 filed on Aug. 29, 2008 including the specification, drawings and abstract is incorporated herein by reference in its entirety.

BACKGROUND OF THE INVENTION

1. Field of the Invention

The invention relates generally to an abnormality analysis system for a vehicle and an abnormality analysis method for a vehicle. More specifically, the invention relates to an abnormality analysis system for a vehicle and an abnormality analysis method for a vehicle, which are used to estimate the cause of an abnormality if it is determined that an abnormality has occurred in a vehicle based on a vehicle state value which indicates the vehicle state.

2. Description of the Related Art

For example, Japanese Patent Application Publication No. JP-A-2006-251918 (JP-A-2006-251918) describes a failure analysis system that includes multiple in-vehicle sensors which constantly obtain the state information that indicates the states of devices of an automobile, an in-vehicle information storage unit that stores the state information on the devices obtained by the multiple in-vehicle sensors, a shared information database which is provided outside the automobile and in which the information on a phenomenon of a failure caused in the automobile, which is input in the shared information database by an input unit, and the information on the failure, which is contained in the state information stored in the information storage unit, are linked with each other and stored, and a failure analysis unit that analyzes the failure based on the collected information on vehicle failures. In the failure analysis system, the cause of the failure that is detected in the automobile is estimated, and the failure information and the vehicle state at the time of occurrence of the failure are stored in the database.

However, because the failure analysis unit described in JP-A-2006-251918 analyzes the failure with the use of the entire failure information stored in the shared information database, a high processing load is placed on the failure analysis unit during the failure analysis.

SUMMARY OF THE INVENTION

The invention provides an abnormality analysis system for a vehicle and an abnormality analysis method for a vehicle with which an abnormality of a vehicle is analyzed at a reduced processing load.

A first aspect of the invention relates to an abnormality analysis system for a vehicle that estimates a cause of an abnormality of the vehicle when an abnormality of the vehicle is detected based on a vehicle state value that indicates the state of the vehicle. The abnormality analysis system includes: a factor identifying information extraction unit that extracts factor identifying information which is used to identify a factor of the abnormality based on the vehicle state value; a database that contains data groups which correspond to respective categories of the factor identifying information and which store causes of abnormalities and vehicle state values at the time of occurrence of the abnormalities; and an abnormality cause estimation unit that executes a process for estimating the cause of the abnormality of the vehicle with the use of the data group that corresponds to the category of the factor identifying information extracted by the factor identifying information extraction unit.

According to the first aspect of the invention, when an abnormality is detected, first, the abnormality factor identifying information is extracted to identify the factor of the abnormality and then detailed abnormality analysis is executed with the use of only the selected data, instead of executing abnormality analysis with the use of the database that contains detailed data immediately after the abnormality is detected. Therefore, the abnormality is analyzed at a reduced processing load, and the time that is required to execute the process for analyzing the abnormality is reduced. In addition, during extraction of the factor identifying information, whether the factor of the abnormality is a malfunction or another factor, for example, an erroneous operation, is determined. As a result, it is possible to take appropriate measures.

In the first aspect of the invention, the factor identifying information extraction unit may be mounted in the vehicle, and the database and the abnormality cause estimation unit may be formed as a vehicle exterior diagnostic unit and provided outside of the vehicle.

With the configuration described above, the efficiency of the abnormality analysis is improved because only the factor identification is executed in the vehicle, and the detailed abnormality analysis is executed by the vehicle exterior diagnostic unit. In addition, the in-vehicle unit may include a computation unit having the minimum necessary capacity, and the vehicle exterior diagnostic unit may include a unit having a high accuracy. As a result, it is possible to improve the accuracy of the abnormality analysis while reducing the weight of the vehicle.

The thus configured abnormality analysis system may further include a communication unit that transmits the factor identifying information extracted by the factor identifying information extraction unit to the vehicle exterior diagnostic unit.

With this configuration, the factor identifying information is transmitted to the vehicle exterior diagnostic unit in real time. As a result, the result of abnormality analysis executed by the vehicle exterior diagnostic unit is promptly obtained.

In the configuration described above, each of the data groups in the database may contain training data.

With this configuration, the accuracy of the data in the data groups in the database is improved by executing learning, and necessary data is easily added to the data in the data groups. As a result, it is possible to execute abnormality analysis with higher accuracy as the learning proceeds.

In the abnormality analysis system according to the first aspect of the invention, the categories of the factor identifying information may include a category of information on a temporary abnormality that is neither a component malfunction nor a system malfunction.

With this configuration, it is possible to distinguish temporary abnormalities such as an erroneous operation performed by a driver, a temporary change in the traveling state, and a temporary increase in a processing load from malfunctions. As a result, it is possible to execute abnormality analysis with high accuracy.

In the thus configured abnormality analysis system, the factor identifying information extraction unit may execute a process for extracting the factor identifying information on the temporary abnormality before extracting the factor identifying information on the component malfunction or the system malfunction, and the factor identifying information extraction unit may extract the vehicle state value that is not classified in the category of the factor identifying information on the temporary abnormality, as the factor identifying information on the component malfunction or the system malfunction.

With this configuration, whether the abnormality is the temporary abnormality that is not a malfunction is first determined. If it is determined that the abnormality is the temporary abnormality, this temporary abnormality is promptly excluded from the analysis of the abnormality due to a malfunction. Accordingly, it is possible to execute the abnormality analysis at a reduced processing load, and reduce the possibility of an erroneous determination that a malfunction has occurred although no malfunction has occurred. As a result, it is possible to improve the accuracy of the estimation of the cause of the abnormality.

A second aspect of the invention relates to an abnormality analysis method for a vehicle for estimating a cause of an abnormality of the vehicle when an abnormality of the vehicle is detected based on the vehicle state value that indicates the state of the vehicle. The abnormality analysis method includes: extracting factor identifying information that is used to identify a factor of the abnormality based on the vehicle state value; selecting, from a database that contains data groups which correspond to respective categories of the factor identifying information and which store causes of abnormalities and vehicle state values at the time of occurrence of the abnormalities, the data group that corresponds to the category of the extracted factor identifying information; and estimating the cause of the abnormality of the vehicle with use of the selected data group.

According to the aspects of the invention described above, it is possible to analyze an abnormality of the vehicle with reduced processing load, and improve the accuracy of determination of the abnormality cause.

BRIEF DESCRIPTION OF THE DRAWINGS

The features, advantages, and technical and industrial significance of this invention will be described in the following detailed description of an example embodiment of the invention with reference to the accompanying drawings, in which the same or corresponding portions will be denoted by the same reference numerals, and wherein:

FIGS. 2A and 2B are tables showing an example of the contents of a process executed by a factor identifying information extraction unit of the abnormality analysis system according to the embodiment of the invention, FIG. 2A showing an example in which control values are classified into several categories of factor identifying information, and FIG. 2B showing examples of abnormal states of a vehicle that may be caused by factors that are identified based on vehicle state values in FIG. 2A;

FIG. 4 is a table showing an example of training data stored in a database;

DETAILED DESCRIPTION OF THE EMBODIMENT

Hereafter, an embodiment of the invention will be described with reference to the accompanying drawings.

Figure 1:
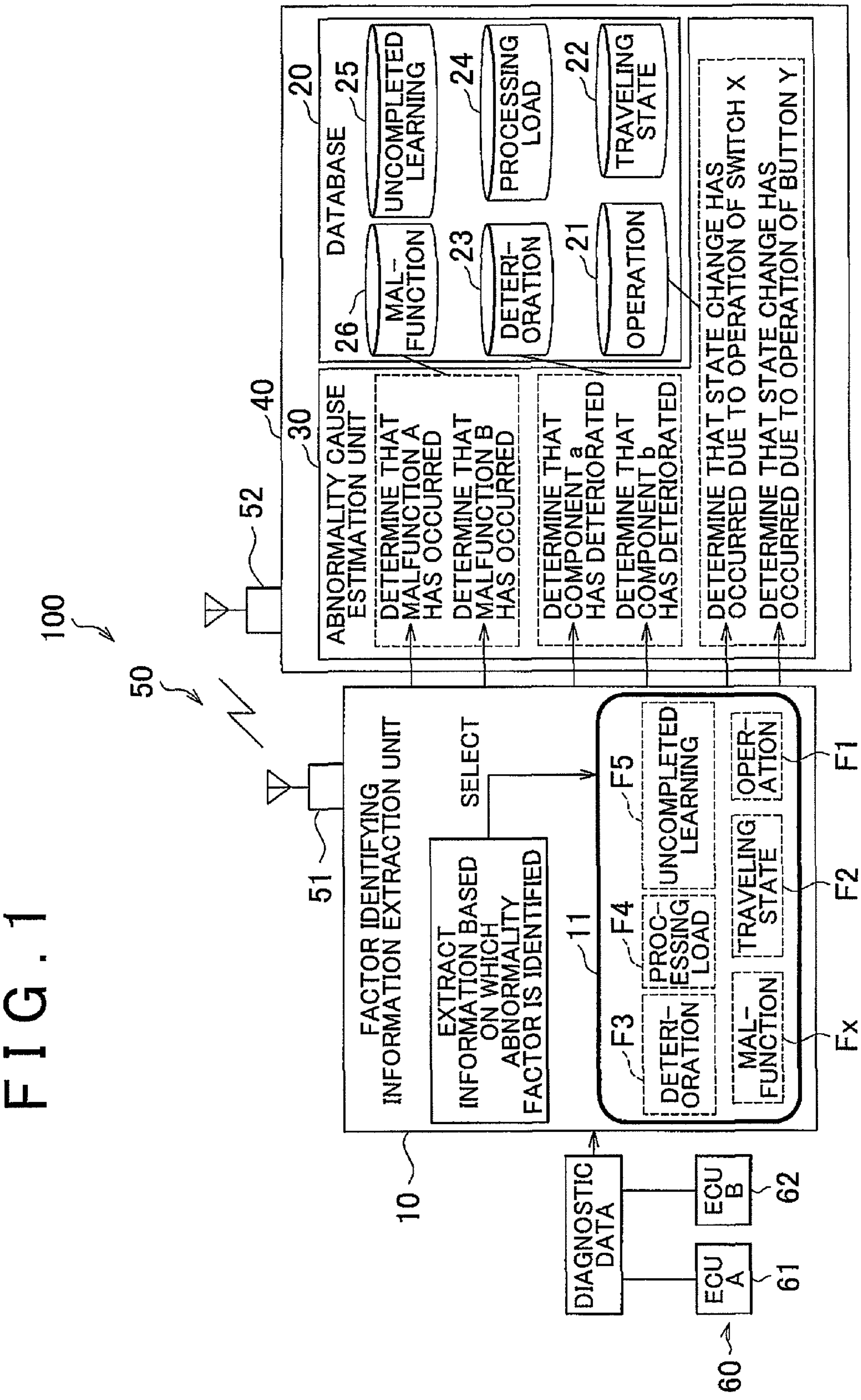
FIG. 1 is a diagram showing an example of the overall structure of an abnormality analysis system for a vehicle according to an embodiment of the invention.

FIG. 1 is a view showing an example of the overall structure of an abnormality analysis system 100 according to an embodiment of the invention. As shown in FIG. 1, the abnormality analysis system 100 according to the embodiment of the invention includes a factor identifying information extraction unit 10, a database 20, and an abnormality cause estimation unit 30. The database 20 and the abnormality cause estimation unit 30 may be formed integrally with each other as a vehicle exterior diagnostic unit 40, and provided outside a vehicle. When the database 20 and the abnormality cause estimation unit 30 are formed integrally with each other as the vehicle exterior diagnostic unit 40, the abnormality analysis system 100 according to the embodiment of the invention may further include a communication unit 50.

When an abnormality of the vehicle is detected, the factor identifying information extraction unit 10 extracts the factor identifying information used to identify the factor of the abnormality based on vehicle state values at the time of occurrence of the detected abnormality.

For example, various detected values that are recorded in an ECU (Electronic Control Unit) which controls the vehicle may be used as the vehicle state values, that is, the data which indicates the vehicle state. For example, values detected by sensors in an operation system such as a door switch and a mirror switch and values such as the acceleration and the vehicle speed detected by sensors in a traveling information system are input in an ECU 60 as the vehicle state values. Therefore, the ECU 60 detects and stores these detected values as the vehicle state values. The ECU 60 provided in the vehicle executes multiple controls that correspond to respective functions or respective sensor systems. For example, the ECU 60 executes a control for the operation system and another control for the traveling information system. Therefore, the ECU 60 may be formed of multiple ECUs, for example, an ECUA 61 and an ECUB 62 which execute different functions or which are used for different purposes. The vehicle state values detected by each ECU 60 are input in the factor identifying information extraction unit 10 as the diagnostic data used to analyze an abnormality.

Whether an abnormality has occurred in a vehicle 70 may be determined based on the values detected by the above-mentioned various sensors provided in the vehicle. Examples of the sensors related to the engine control include an accelerator position sensor that detects the accelerator pedal operation amount, a throttle position sensor that detects the throttle valve opening amount, a cam position sensor that detects the camshaft angle, a crank position sensor that detects the crank angle and the engine speed, and a coolant temperature sensor that detects the engine coolant temperature. Whether the engine is driven properly is determined, for example, by determining whether the values detected by these sensors are within predetermined ranges of normal values. That is, the values detected by these sensors are used as the vehicle state values that indicate the vehicle state. These sensors are connected to an engine control computer, and the values detected by these sensors are input in the engine control computer. Therefore, whether an abnormality has occurred is determined by the engine control computer. Because the fuel injection timing and the ignition timing are controlled based on the values detected by the multiple sensors, whether an abnormality has occurred in the control or whether an abnormality has occurred in each component may be determined based on the relationship between the multiple sensor values and these timings. Using various detected values makes it possible to detect an abnormality that is caused by a complex cause. If occurrence of an abnormality is detected, the vehicle state values at the time of occurrence of the abnormality may be stored as the vehicle information. These vehicle state values may be referred to as freeze frame data (FFD).

For example, in electric power steering, the direction in which a force is applied to assist a steering operation is computed based on a torque sensor signal that indicates a value detected by a torque sensor, and a drive circuit is controlled to output a drive current to a motor. In this case, whether an abnormality has occurred in the torque sensor itself may be determined based on the value indicated by the torque sensor signal, whether an abnormality has occurred in driving of the motor is determined based on the motor current value, and whether an abnormality, for example, overheating or overcurrent has occurred is determined based on the temperature of the motor. In this case, the value indicated by the torque sensor signal, the motor current value, the temperature of the motor, etc. are used as the vehicle state values. If the computed direction in which the force is applied to assist the steering operation and the rotational angle of the motor do not correspond to each other, it is determined that an abnormality is caused by multiple causes including a cause related to the drive circuit. In the electric power steering, because control is executed by an electric power steering computer, whether an abnormality has occurred may be determined by the electric power steering computer and the vehicle state values at the time of occurrence of the abnormality may be stored as the vehicle information.

In a manner similar to the above-described manner, it is possible to determine whether an abnormality has occurred in a drive system that includes a brake system and a transmission system, an air-conditioning system that includes a heater and an air-conditioner, a body system that includes a window and a mirror, and an electric system that includes a navigation system and an audio system.

Factor identifying information data 11 is classified into several categories of factor identifying information based on abnormality factors. The factor identifying information extraction unit 10 determines the category into which a vehicle state value received as the diagnostic data is classified. Then, the factor identifying information extraction unit 10 extracts the factor identifying information in the category in which the vehicle state value is classified. The factor identifying information extraction unit 10 has the factor identifying information data 11 in which the factor identifying information is stored.

The factor identifying information data 11 is classified into several categories that correspond to respective factor data groups that are used when the abnormality cause estimation unit 30 executes detailed estimation of the cause of an abnormality of the vehicle in order to determine the cause of the abnormality. As shown in FIG. 1, the factor identifying information data 11 has six categories of factor identifying information, that is, a category F1 of the factor identifying information on an operation, a category F2 of the factor identifying information on the traveling state, a category F3 of the factor identifying information on deterioration of a component, a category F4 of the factor identifying information on a processing load, a category F5 of the factor identifying information on uncompleted learning, and a category Fx of the factor identifying information on a malfunction. When it is determined that an abnormality has occurred in the vehicle based on a vehicle state value, the factor identifying information extraction unit 10 determines, based on the detected vehicle state value, the category of the factor identifying information in the factor identifying information data 11, which should be extracted to identify the factor of the abnormality. Thus, the factor identifying information extraction unit 10 determines the category of the factor identifying information which contains the factor of the abnormality of the vehicle. The details of the manner in which the determination is made will be described later.

The accuracy of a computation process that is executed by the factor identifying information extraction unit 10 to extract the factor identifying information need not be so high as long as the factor of an abnormality is identified. Therefore, although it is usually considered that an enormous amount of data is necessary to analyze an abnormality, the amount of the factor identifying information data 11 need not be so enormous. The amount of factor identifying information data 11 is enough if the factor of the abnormality is identified based on the factor identifying information data 11. The computation process executed by the factor identifying information extraction unit 10 is a computation process for identifying the factor of the abnormality. Therefore, the computation throughput is reduced. Accordingly, the computation processing capacity of a CPU (Central Processing Unit) need not be so high as long as the CPU can execute computation for identifying the factor of an abnormality.

The database 20 is a storage unit that stores causes of abnormalities of the vehicle and vehicle state values at the time of occurrence of the abnormalities. The causes and the vehicle state values are stored in the data groups in the database 20. The database 20 contains data groups 21, 22, 23, 24, 25 and 26 that correspond to the categories of factor identifying information F1, F2, F3, F4, F5 and Fx in the factor information identifying data 11 of the factor identifying information extraction unit 10, respectively. The factor information identifying data 11 is classified into the categories of factor identifying information F1, F2, F3, F4, F5 and Fx based on the types of factors. FIG. 1 shows the operation-related factor data group 21, the traveling state-related factor data group 22, the deterioration-related factor data group 23, the processing load-related factor data group 24, the uncompleted learning-related factor data group 25, and the malfunction-related factor data group 26.

The data groups 21, 22, 23, 24, 25 and 26 in the database 20, which correspond to the categories of factor identifying information F1, F2, F3, F4, F5 and Fx in the factor identifying data 11, respectively, each contain a wealth of data on the causes of abnormalities of the vehicle and the vehicle state values at the time of occurrence of the abnormalities. The amount of data in each of the data groups 21, 22, 23, 24, 25 and 26 is sufficient to estimate the cause of an abnormality based on the factor identifying information in the corresponding category. Therefore, using the database 20 makes it possible to analyze the factor identifying information extracted by the factor identifying information extraction unit 10 in more detail.

The database 20 may contain training data. The database 20 is used to analyze the cause of an abnormality in more detail and more accurately. Therefore, if the database 20 contains the training data that has a learning function, updates the data itself and enhances the analysis function, the abnormality is analyzed more accurately.

The abnormality cause estimation unit 30 estimates the cause of an abnormality with the use of the data group which is selected from among the data groups 21, 22, 23, 24, 25 and 26, and which corresponds to the category of factor identifying information extracted by the factor identifying information extraction unit 10. Therefore, when it is determined that an abnormality has occurred in the vehicle, the abnormality cause estimation unit 30 accesses the data group in the database 20, which corresponds to the category of factor identifying information extracted by the factor identifying information extraction unit 10, and executes computation for estimating the cause of the abnormality with the use of the data on causes of abnormalities and vehicle state values at the time of occurrence of the abnormalities, which is stored in the data group of the database 20. If necessary, the abnormality cause estimation unit 30 executes a computation process based on the data. In existing technologies, the data in the database 20 is not classified. Therefore, it is necessary to check and analyze the entire data in the database 20. However, in the abnormality analysis system 100 according to the embodiment of the invention, the abnormality cause estimation unit 30 selects one of the data groups 21, 22, 23, 24, 25 and 26 that correspond to respective categories of factor identifying information, and executes analysis with the use of the data in the selected data group. Therefore, the processing load placed on the abnormality cause estimation unit 30 is significantly lower than that in the existing technologies.

FIG. 1 shows an example in which the abnormality cause estimation unit 30 determines the type of a malfunction that has caused an abnormality, an example in which the abnormality cause estimation unit 30 determines a component in which deterioration that has caused an abnormality occurs, and an example in which the abnormality cause estimation unit 30 determines a component over which an operation that has caused a state change responsible for an abnormality is performed. For example, when the factor identifying information extraction unit 10 extracts the factor identifying information which indicates that the factor of an abnormality is a malfunction, the abnormality cause estimation unit 30 accesses the malfunction-related factor data group 26 in the database 20, and estimates the cause of the abnormality based on the data stored in the malfunction-related factor data group 26. For example, the abnormality cause estimation unit 30 determines that a malfunction A has occurred. Similarly, when another malfunction has occurred, the abnormality cause estimation unit 30 executes a process similar to that described above and determines that a malfunction B has occurred.

When an abnormality of the vehicle is detected, if the factor identifying information extraction unit 10 extracts the factor identifying information which indicates that the factor of the abnormality is deterioration of a component, the abnormality cause estimation unit 30 accesses the deterioration-related factor data group 23 in the database 20, and analyzes the abnormality. Then, the abnormality cause estimation unit 30 determines that the cause of the abnormality is deterioration of a component "a". When a component "b" has deteriorated, the abnormality cause estimation unit 30 executes a process similar to that describes above, and determines that the cause of the abnormality is deterioration of the component "b". When the analysis result shows that both the component "a" and the component "b" have deteriorated, the abnormality cause estimation unit 30 determines that the cause of the abnormality is deterioration of both the component "a" and the component "b".

When an abnormality of the vehicle is detected, if the factor identifying information extraction unit 10 extracts the factor identifying information which indicates that the factor of the abnormality is a temporary state change due to an erroneous operation, the abnormality cause estimation unit 30 accesses the operation-related factor data group 21. Then, the abnormality cause estimation unit 30 executes a computation process for analyzing the abnormality in detail, and determines the cause of the abnormality. For example, the abnormality cause estimation unit 30 determines that the cause of the abnormality is a state change due to an operation of a switch X, that the cause of the abnormality is a state change due to an operation of a button Y, or that the cause of the abnormality is a state change due to both the operation of the switch X and the operation of the button Y.

If it is determined that the factor of an abnormality is a malfunction, after a portion in which a malfunction occurs is determined, for example, after a vehicle component in which a malfunction occurs or a system in which a malfunction occurs is determined, for example, repairs need to be made to eliminate the cause of the malfunction. However, if an abnormality of the vehicle is detected due to deterioration that does not exert much influence on a component or due to an erroneous operation, repairs need not be made because the abnormality is just a temporary abnormality and is not a malfunction. Therefore, the measures that will be taken differ depending on whether the abnormality is a malfunction or a temporary abnormality other than a malfunction. The abnormality analysis system 100 according to the embodiment of the invention analyzes an abnormality in a manner suitable for the measure that will be taken. For example, when the cause of an abnormality due to a malfunction is analyzed, the malfunction-related factor data group 26 that contains more detailed information is used, and a higher priority is given to the computation process for analyzing the cause of the abnormality. On the other hand, if the factor of an abnormality is other than a malfunction, the abnormality is analyzed when a computation process having a higher priority is not executed. As described above, with the abnormality analysis system according to the embodiment of the invention, it is possible to take flexible and appropriate measures by determining at an early stage whether an abnormality has been caused due to a malfunction or due to a factor other than a malfunction.

The abnormality cause estimation unit 30 executes the computation process for estimating the cause of an abnormality of the vehicle with the use of the database 20. Therefore, the abnormality cause estimation unit 30 may be formed of a computer that includes a CPU and storage units such as a ROM (Read Only Memory), and a RAM (Random Access Memory).

The database 20 and the abnormality cause estimation unit 30 may be provided in the vehicle. However, the database 20 and the abnormality cause estimation unit 30 are usually provided outside the vehicle, for example, in an automobile dealer or a control center. As described above, because the abnormality cause estimation unit 30 executes the computation process for analyzing an abnormality accurately with the use of a wealth of data in the data groups in the database 20, the amount of data stored in the database 20 and the computation throughput of the abnormality cause estimation unit 30 are both large. Therefore, preferably, the database 20 and the abnormality cause estimation unit 30 are provided outside the vehicle. When the database 20 and the abnormality cause estimation unit 30 are provided outside the vehicle, the database 20 and the abnormality cause estimation unit 30 may be formed integrally with each other as the vehicle exterior diagnostic unit 40. For example, when the vehicle exterior diagnostic unit 40 is provided in an automobile dealer, if the vehicle is placed in the automobile dealer, the in-vehicle factor identifying information extraction unit 10 is connected to the vehicle exterior diagnostic unit 40 with a connecting wire to analyze the cause of the abnormality.

Alternatively, the communication unit 50 that enables communication between the vehicle and the vehicle exterior diagnostic unit 40 may be provided, and the extracted factor identifying information may be transmitted from the in-vehicle factor identifying information extraction unit 10 to the vehicle exterior diagnostic unit 40. For example, the vehicle may be provided with a vehicle-side communication unit 5 1, and the vehicle exterior diagnostic unit 40 may be provided with a vehicle exterior communication unit 52. Thus, the factor identifying information may be transmitted from the factor identifying extraction unit 10 to the vehicle exterior diagnostic unit 40.

The method of communication that is provided by the communication unit 50 is not particularly limited. The communication unit 50 may provide communication via a wire or wirelessly, or may provide communication via a network, for example, LAN (Local Area Network). When the communication unit 50 is used, the vehicle exterior diagnostic unit 40 may be provided at any given locations other than an automobile dealer. A center, for example, G-Book may be used. An abnormality is analyzed in real time by using the communication unit 50.

Next, a method in which the factor identifying information extraction unit 10 identifies the factor of an abnormality will be described in detail with reference to FIG. 2. FIG. 2 is a diagram for describing an example of the contents of a process executed by the factor identifying information extraction unit 10 of the abnormality analysis system 100 according to the embodiment of the invention.

FIG. 2A is a table showing an example in which various control values, based on which abnormality factors other than malfunctions are identified, are classified into several categories of factor identifying information. As shown in FIG. 2A, the control values are classified into four categories of factor identifying information, that is, factor identifying information categories A, B, C and D, based on the features and the types of the detected information.

The factor identifying information category A contains the vehicle state values that indicate the information on the operation system and an input sensor system. For example, the door switch state is the information that indicates the open/closed state of a door, and the mirror switch state is the information that indicates the deployed/retracted state of a door mirror. Similarly, the lock switch state is the information that indicates whether the door is locked or unlocked, and the electric seat switch state is the information that indicates whether a switch for an electrically-driven seat is on or off. These vehicle state values all indicate the information on the operations of the switches, etc. performed by the user. Therefore, when it is determined that an abnormality has occurred in the vehicle based on these vehicle state values, there is a high possibility that the abnormality has occurred due to an erroneous operation performed by the user. Therefore, these vehicle state values are classified into the factor identifying information category A that contains the information on the operation system and the input sensor system.

Other vehicle state values in the factor identifying information category A will be described. The lamp switch state and the cruise switch state are the information that indicates whether the user has turned on or off switches. The steering state, the brake pedal state and the accelerator pedal state are the information that indicates operations performed by the driver. The transmission lever state is the information that indicates the position at which a transmission lever is fixed by the driver, and the parking brake state is the information that indicates the amount by which a brake lever is pulled by the driver.

The factor identifying information category B contains the vehicle state values that indicate the traveling information. These vehicle state values may change depending on the traveling state of the vehicle. For example, when the vehicle travels on a rough gravel road and therefore the vehicle moves up-and-down by a large amount, the acceleration in the up-and-down direction greatly changes. When the vehicle travels on a long and steep downhill slope, the vehicle speed and the acceleration exhibit high values although the accelerator pedal operation amount is small. As shown in FIG. 2A, examples of the vehicle state values that indicate the traveling information include the acceleration, the vehicle speed, the engine speed, the shift state of a transmission, the fuel injection state, the information on a road on which the vehicle travels and the weather information.

The factor identifying information category C contains the vehicle state values that indicate the system information. For example, the power supply voltage may change depending on the magnitude of an electric load, and the state of the microcomputer may change depending on the magnitude of a processing load. As shown in FIG. 2, examples of the vehicle state values that indicate the system information include the power supply voltage, the electric load state and the microcomputer state.

The factor identifying information category D contains the vehicle state values based on which the factor of an abnormality of the vehicle is identified as an inappropriate correction/learning state. Some ECUs mounted in vehicles have various learning functions. If learning is executed inappropriately or control values are corrected inappropriately, an abnormality may occur in the vehicle. Therefore, the vehicle state values related to learning and corrections are classified into the category of the factor identifying information based on which the factor of an abnormality of the vehicle is identified as the inappropriate correction/learning state. As shown in FIG. 2, examples of the vehicle state values contained in the category of such factor identifying information include the control learned value, the zero-point correction value, the lens learned value, the steering correction value, the acceleration correction value and the accelerator sensor correction value.

Figure 2B:
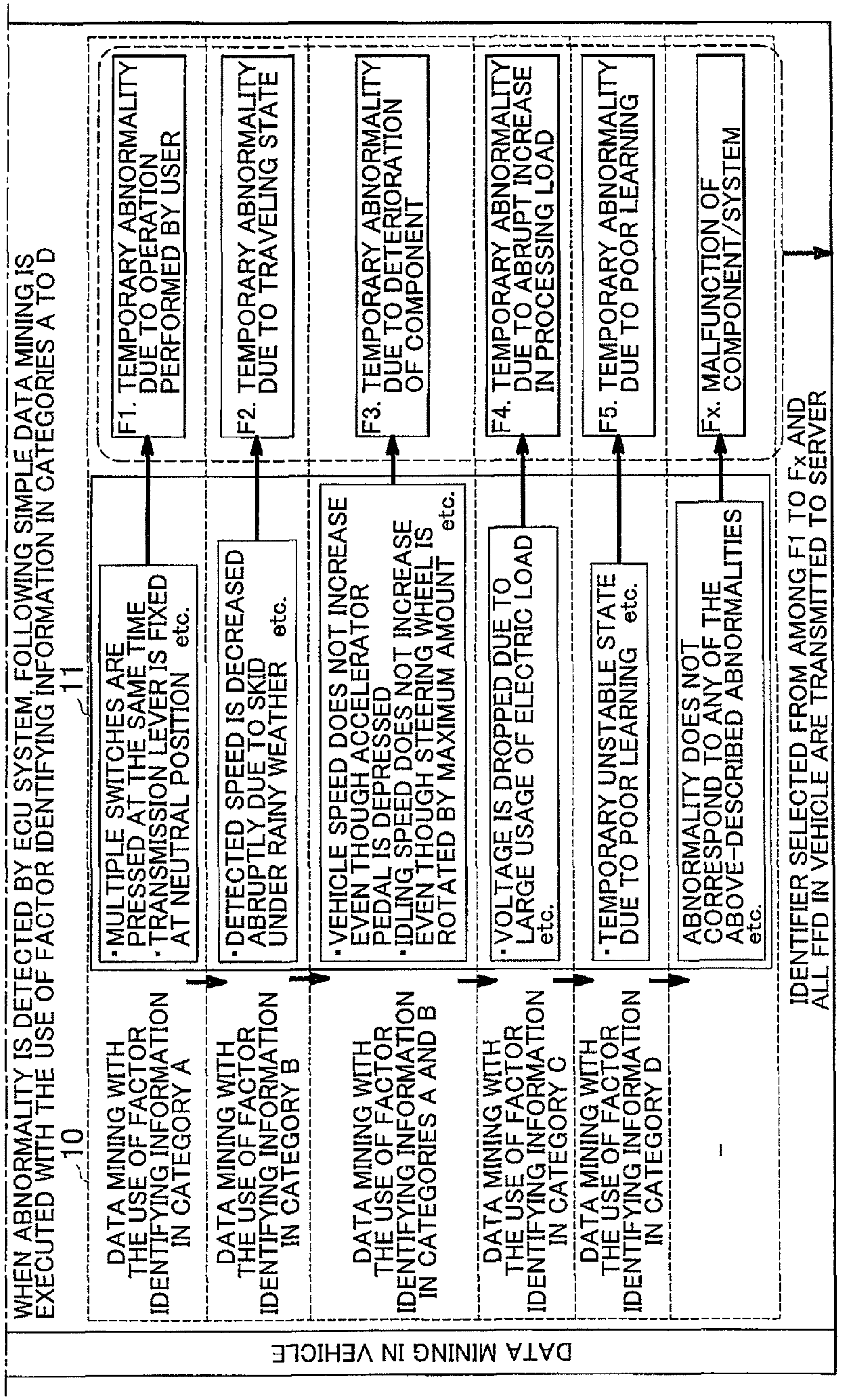

FIG. 2B is a table showing examples of abnormal states of the vehicle that may be caused by the factors that are identified based on vehicle state values in FIG. 2A.

Examples of abnormal states of the vehicle, which are caused by the factors identified based on the vehicle state values in the factor identifying information category A, include the state where multiple switches are turned on at the same time, the state where the transmission lever is fixed at the neutral position, the state where an accelerator pedal is depressed with a brake pedal depressed by the maximum amount, the state where a steering wheel is rotated by the maximum amount and kept at this position for a long time while the vehicle does not travel, etc. The abnormal state where the transmission lever is fixed at the neutral position is detected based solely on the transmission lever state. However, the abnormal state where the accelerator pedal is depressed with the brake pedal depressed by the maximum amount is detected only after the brake pedal state and the accelerator pedal state are both detected. Similarly, the abnormal state where multiple switches are turned on at the same time is detected based on not only one switch state but multiple switch states. Therefore, the abnormal state is determined based on the combination of the required vehicle state values in the factor identifying information category A in FIG. 2A. For example, the factor identifying information extraction unit 10 may store various patterns of combinations of the vehicle state values at the time of occurrence of abnormalities in the factor identifying information data 11, and check the detected vehicle state values in the factor identifying information category A with the stored various combinations of the vehicle state values to determine whether the abnormality is a temporary abnormality due to an operation performed by the user. When an abnormal state of the vehicle is recognized as a result of data mining executed with the use of the factor identifying information in the category A, it is determined that the abnormality is a temporary abnormality caused by an operation performed by the user and an identifier F1 is provided.

If the factor of the abnormality is not identified by data mining executed with the use of vehicle state values in the factor identifying information category A, data mining is executed with the use of the factor identifying information in the category B. The control values that indicate the traveling information are classified into the factor identifying information category B. Examples of abnormal states of the vehicle, which are caused by the factors identified based on the vehicle state values in the factor identifying information category B, include the state where the detected vehicle speed abruptly decreases due to a skid under rainy weather, and the state where a load abruptly increases because the road face is significantly bumpy. For example, when the detected vehicle speed abruptly decreases due to a skid under rainy weather, the factor of the abnormality is extracted based on the combination of the weather information and the vehicle speed. When the load abruptly increases because the road face is significantly bumpy, the factor of the abnormality is identified based on the vehicle state values included in the factor identifying information category B such as the information on the road on which the vehicle travels, and the acceleration in the up-and-down direction. When the factor of the abnormality of the vehicle is identified as a result of data mining executed with the use of the factor identifying information in the category B, it is determined that the abnormality is a temporary abnormality due to the traveling state, and an identifier F2 is provided.

If the factor of the abnormality is identified neither by the data mining executed with the use of only the factor identifying information in the category A nor by the data mining executed with the use of only the factor identifying information in the category B, data mining is executed with the use of both the factor identifying information in the category A and the factor identifying information in the category B. For example, if the vehicle speed does not increase even though the accelerator pedal is depressed, the factor of the abnormality is identified based on the accelerator pedal state that is classified into the factor identifying information category A shown in FIG. 2A and the engine speed that is classified into the factor identifying information category B shown in FIG. 2A. If the idling speed does not increase even though the steering wheel is rotated by the maximum amount, the factor of the abnormality is identified based on the combination of the steering state that is classified into the factor identifying information category A in FIG. 2A and the engine speed that is classified into the factor identifying information category B in FIG. 2A. If a component does not operate even though a switch is turned on, the factor of the abnormality is identified based on the combinations of the various switch states that are classified in the factor identifying information category A and the vehicle state values classified in the factor identifying information category B, which are supposed to change in response to operations of the switches. If gears are not changed even though the transmission lever is operated, the factor of the abnormality is identified based on the combination of the transmission lever state that is classified into the factor identifying information category A and the transmission shift state that is classified into the factor identifying information category B. If the factor of the abnormality of the vehicle is identified based on the vehicle state value included in the factor identifying information category A and the vehicle state value included in the factor identifying information category B as a result of data mining executed with the use of the factor identifying information in the categories A and B, it is determined that the abnormality is a temporary abnormality due to deterioration of a component. For example, if the component does not operate even though the switch is turned on or if the gears are not changed even though the transmission lever is operated, it may be considered that a temporary contact failure has occurred. If the operation state and the traveling state are appropriate, the component operates properly in many cases. In such a case, it is determined that a temporary abnormality has occurred due to deterioration of the component, and an identifier F3 is provided.

If the factor of the abnormality is not identified by the data mining executed with the use of both the factor identifying information in the category A and the factor identifying information in the category B, data mining is executed with the use of the factor identifying information in the category C. Examples of abnormal states of the vehicle, which are caused by the factors identified based on the vehicle state values in the factor identifying information category C, include the state where the voltage is dropped due to a large usage of electric load and the state where the throughput capacity of the microcomputer is reduced. If the voltage is dropped due to a large usage of electric load, the electric load value is temporarily increased and the power supply voltage is temporarily decreased due to the large usage of electric load. Therefore, the factor of the abnormality is identified based on the vehicle state values in the factor identifying information category C. When the throughput capacity of the microcomputer is reduced, for example, when the microcomputer is placed in an abnormal state due to a temporary increase in the load, the factor of the abnormality is identified based the processing load value and the microcomputer state. When the factor of the abnormality of the vehicle is identified as a result of data mining executed with the use of the factor identifying information in the category C, it is determined that the abnormality is a temporary abnormality due to an abrupt increase in the processing load, and an identifier F4 is provided.

If the factor of the abnormality is not identified by the data mining executed with the use of the factor identifying information in the category C, data mining is executed with the use of the factor identifying information in the category D. Examples of abnormal states, which are caused by the factors identified based on the vehicle state values in the factor identifying information category D, include the temporary unstable state due to poor learning and the temporary unstable state due to inappropriate writing of a correction value. For example, if the temporary unstable state due to poor learning is caused, the control learned value, the lens learned value or the accelerator sensor learned value in the factor identifying information category D exhibits an abnormal value. If the temporary unstable state due to inappropriate writing of a correction value is caused, the zero-point correction value, the steering correction value or the acceleration correction value in the factor identifying information category D exhibits an abnormal value. Therefore, when it is determined that the vehicle state value in the factor identifying information category D exhibits an abnormal value as a result of data mining executed with the use of the factor identifying information in the category D, it is determined that the factor of the abnormality of the vehicle is poor learning. In this case, it is determined that the abnormality is a temporary abnormality due to poor learning, etc. and an identifier F5 is provided.

If the factor of the abnormality is not identified by the data mining executed with the use of the factor identifying information in the category D, it is determined that the abnormality of the vehicle is not a temporary abnormality and the factor of the abnormality is a malfunction of a component or a malfunction of a system. That is, if none of the factors of temporary abnormalities is identified and no factor identifying information is extracted, it is determined that the factor of the abnormality of the vehicle is a malfunction of a component or a malfunction of a system, and an identifier Fx is provided. In this case, it is necessary to analyze the abnormality due to the malfunction.

In the abnormality analysis system 100 for a vehicle according to the embodiment of the invention, when an abnormality of the vehicle is detected, the factor identifying information extraction unit 10 provided in the vehicle first executes, with the use of the vehicle state values detected by the in-vehicle sensors, a process for extracting the factor identifying information which indicates that the abnormality is a temporary abnormality that is caused by a factor other than a malfunction, etc. If no factor identifying information, which indicates that the abnormality is a temporary abnormality, is extracted, the factor identifying information extraction unit 10 determines that a malfunction is the factor of the abnormality. In this way, a temporary abnormality that does not require repairs is recognized in the vehicle at an early stage, and is excluded from the targets for the analysis of an abnormality due to a malfunction, which requires high processing load. To extract the factor identifying information, it is necessary to just determine the category of the factor identifying information that contains the factor of the abnormality based on the limited control values. Accordingly, the computation processing load in the vehicle is reduced, which makes it possible to mount a CPU having a smaller capacity in the vehicle.

When extraction of the factor identifying information is completed in the vehicle and which of the identifiers F1 to F5 and Fx is provided is determined, the information indicated by the provided identifier and all the vehicle state values detected in the vehicle are stored. When the vehicle is brought to an automobile dealer and the abnormality is analyzed in the automobile dealer, the stored identifier and the vehicle state values detected when the abnormality of the vehicle occurs are transmitted from the factor identifying information extraction unit 10 to the database 20 and the abnormality cause estimation unit 30. In this case, the data may be transmitted from the factor identifying information extraction unit 10 to the database 20 and the abnormality cause estimation unit 30 via a wire, for example, a connecting wire, or with the use of the communication unit 50. When the data is transmitted from the factor identifying information extraction unit 10 to the vehicle exterior diagnostic unit 40 that includes the database 20 and the abnormality cause estimation unit 30 with the use of the communication unit 50, the identifier which is selected in the factor identifying information extraction unit 10 and the vehicle state values at the time of detection of the abnormality are transmitted from the vehicle-side communication unit 51 to the vehicle exterior communication unit 52 of the vehicle exterior diagnostic unit 40.

Figure 3:
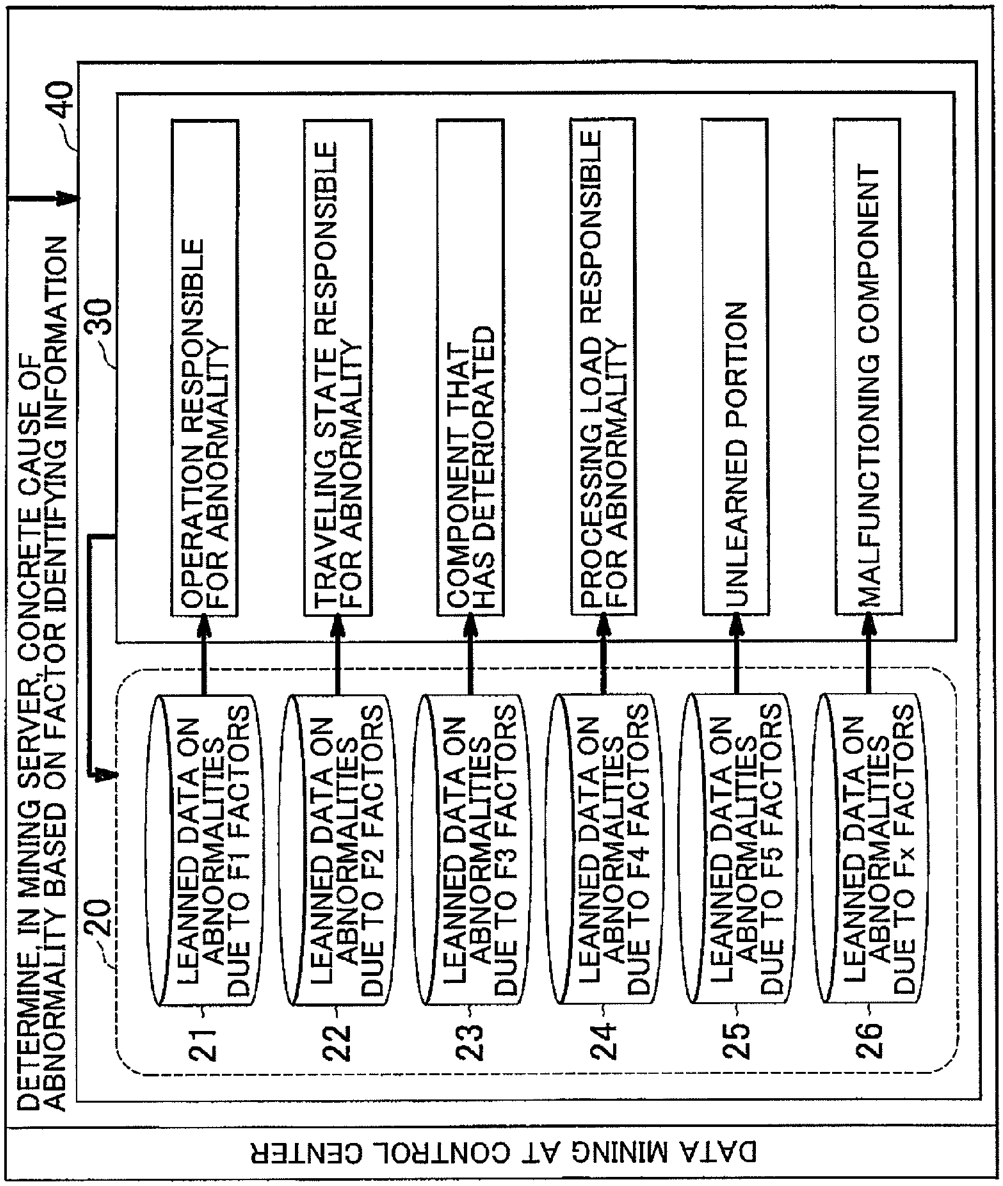
FIG. 3 is a table showing the detailed contents of a process executed by a vehicle exterior diagnostic unit.

FIG. 3 is a table showing the detailed contents of a process executed by the vehicle exterior diagnostic unit 40 that includes the database 20 and the abnormality cause estimation unit 30.

As shown in FIG. 3, the database 20 contains the multiple data groups 21 to 26 that correspond to respective factor identifying information categories, that is, the operation-related factor data group 21, the traveling state-related factor data group 22, the deterioration-related factor data group 23, the processing load-related factor data group 24, the uncompleted learning-related factor data group 25, and the malfunction-related factor data group 26. In each of the data groups 21 to 26 that correspond to the respective factor identifying information categories, the causes of abnormalities and the vehicle state values at the occurrence of the abnormalities are stored. Therefore, for example, in the operation-related factor data group 21, concrete causes of temporary abnormalities due to erroneous operations performed by a user and the vehicle state values at the time of occurrence of the abnormalities are stored. In the traveling state-related factor data group 22, the concrete causes of temporary abnormalities due to the traveling state of the vehicle and the vehicle state values at the time of occurrence of the abnormalities are stored. In the deterioration-related factor data group 23, the causes of abnormalities due to deterioration of components and the vehicle state values at the time of occurrence of the abnormalities are stored. Similarly, in the processing load-related factor data group 24, the causes of abnormalities due to increases in the processing load and the vehicle state values at the time of occurrence of the abnormalities are stored. In the uncompleted learning-related data group 25, the causes of abnormalities due to presence of an uncompleted learning portion or an inappropriate correction value and the vehicle state values at the time of occurrence of the abnormalities are stored. In the malfunction-related factor data group 26, the causes of abnormalities due to malfunctions of the components and malfunction of the systems and the vehicle state values at the time of occurrence of the abnormalities are stored.

The data group 21 to 26 each of which contains a wealth of data based on which an abnormality diagnosis can be performed by executing data mining. With the use of the data groups 21 to 26 each of which contains wealth of specialized information, the vehicle exterior diagnostic unit 40 analyzes the abnormality with high accuracy, and determines the concrete cause of the abnormality.

Upon reception of the information that contains the identifier selected from among the identifier F1 to F5 and Fx and the vehicle state values from the factor identifying information extraction unit 10, the abnormality cause estimation unit 30 analyzes the abnormality with the use of the data group selected from among the data groups 21 to 26, which corresponds to the selected identifier. The abnormality cause estimation unit 30 analyzes the abnormality with the use of only the data group selected from among the data groups 21 to 26. Therefore, the processing load is considerably lower and the abnormality is analyzed in a shorter time than when the abnormality is analyzed with the use of all the data in the database 20. The abnormality analysis may be executed by the abnormality cause estimation unit 30 according to a full-scale data mining method. For example, the abnormality analysis may be executed by the abnormality cause estimation unit 30 according to a method in which correlations among the vehicle state values and characteristic patterns are detected and the knowledge is accumulated. Thus, it is possible to analyze the abnormality with high accuracy and to increase the accuracy as the data is accumulated.

If the abnormality cause estimation unit 30 determines that the factor of an abnormality is one of the factors of temporary abnormalities that are indicated by the identifiers F1 to F5, the factor of the abnormality is not a malfunction. Therefore, measures such as maintenance and design change may be taken. On the other hand, if the abnormality cause estimation unit 30 determines that the factor of an abnormality is the factor that is indicated by the identifier Fx, that is, a malfunction of a component or a malfunction of a system, the portion where the malfunction has occurred is identified. Therefore, the portion where the malfunction has occurred is repaired. Thus, if it is determined that the abnormality is a temporary abnormality caused by a factor other than a malfunction, unnecessary repairs need not be made. On the other hand, if it is determined that the factor of the abnormality is a malfunction, necessary repairs are promptly made. If it is determined that the factor of the abnormality is a malfunction, the abnormality is analyzed with the factors of temporary abnormalities excluded from the analysis. Accordingly, it is possible to analyze the cause of the abnormality based on the selected data. As a result, the accuracy of the analysis is increased.

FIG. 4 is a table showing an example of the training data that is stored in the database 20. As described above, the abnormality cause estimation unit 30 executes learning by executing data mining. Therefore, the knowledge obtained through the learning is stored in the database 20 as the training data. FIG. 4 shows the training data stored in each of the data group 21 to 26 in the database 20.

In the malfunction-related factor data group 26 in which the data on the abnormalities that are caused by malfunctions is stored, values regarding malfunctions of sensors, values regarding wire breakage in switches, values regarding malfunctions of actuators, values regarding malfunctions of systems, etc. are stored as the learned values regarding malfunctions. These values are stored as the vehicle state values at the time of occurrence of abnormalities. Because the vehicle state values at the time of occurrence of abnormalities are regarded as collections of values that are detected by the various in-vehicle sensors when the abnormalities occur, the vehicle state values at the time of occurrence of the abnormalities may be referred to as FFD (Freeze frame Data). In the malfunction-related factor data group 26, for example, "malfunction of a sensor", which is the cause of an abnormality, and the freeze frame data, that is, the vehicle state values at the time of occurrence of the malfunction of the sensor are stored. Similarly, "wire breakage in a switch", which is the cause of an abnormality, and the vehicle state values at the time of occurrence of the wire breakage in the switch are stored in the malfunction-related factor data group 26. Further, "malfunction of an actuator", which is the cause of an abnormality, and the vehicle state values at the time of occurrence of the malfunction of the actuator, and "malfunction of a system", which is the cause of an abnormality and the vehicle state values at the time of occurrence of the malfunction of the system are stored in the malfunction-related factor data group 26. Concerning other malfunctions (not shown), the causes and the vehicle state values at the time of occurrence of the malfunctions are stored in the malfunction-related factor data group 26.

In the operation-related factor data group 21 in which the data on the temporary abnormalities that are caused due to operations performed by users is stored, for example, the data on an abnormality that is caused by operating of the steering wheel by the maximum amount while the vehicle is stopped and the data on an abnormality that is caused by applying brakes suddenly are stored. In the operation-related factor data group 21, for example, "operation of the steering wheel by the maximum amount while the vehicle is stopped", which is the cause of an abnormality, and the vehicle state values corresponding to this abnormality, and "sudden application of brakes", which is the cause of an abnormality, and the vehicle state values corresponding to this abnormality are stored. In the traveling state-related factor data group 22 in which the data on the temporary abnormalities that are caused due to the traveling state is stored, for example, the data on an abnormality that occurs because the vehicle travels on a bumpy road and the data on an abnormality that occurs because the vehicle skids are stored. For example, "traveling on a bumpy road", which is the cause of an abnormality and the vehicle state values corresponding to this abnormality, and "skid", which is the cause of an abnormality and the vehicle state values corresponding to this abnormality are stored in the traveling state-related factor data group 22. For example, when the cause of the abnormality is "skid", the vehicle state values including the engine speed and the vehicle speed are stored. In the processing load-related factor data group 24 in which the data on the temporary abnormalities that are caused due to abrupt increases in the processing load is stored, for example, the data on the abnormalities due to abrupt increases in the load placed on the CPUs is stored. For example, "abrupt increase in the load placed on a CPU", which is the cause of an abnormality, and the vehicle state value corresponding to this cause are stored in the processing load-related factor data group 24. In the deterioration-related factor data group 23 in which the data on the temporary abnormalities that are caused by deterioration of components is stored, the data on abnormalities caused by deterioration of concrete components, for example, deterioration of a component Z and deterioration of a switch Y is stored. For example, "deterioration of the component Z", which is the cause of an abnormality, and the vehicle state values corresponding to this cause, and "deterioration of the switch Y", which is the cause of an abnormality, and the vehicle state values corresponding to this cause are stored in the deterioration-related factor data group 23.

The amount of training data is increased or decreased as the learning proceeds. Necessary data is added to the training data and unnecessary data is deleted from the training data, whereby more accurate training data is obtained.

Figure 5:
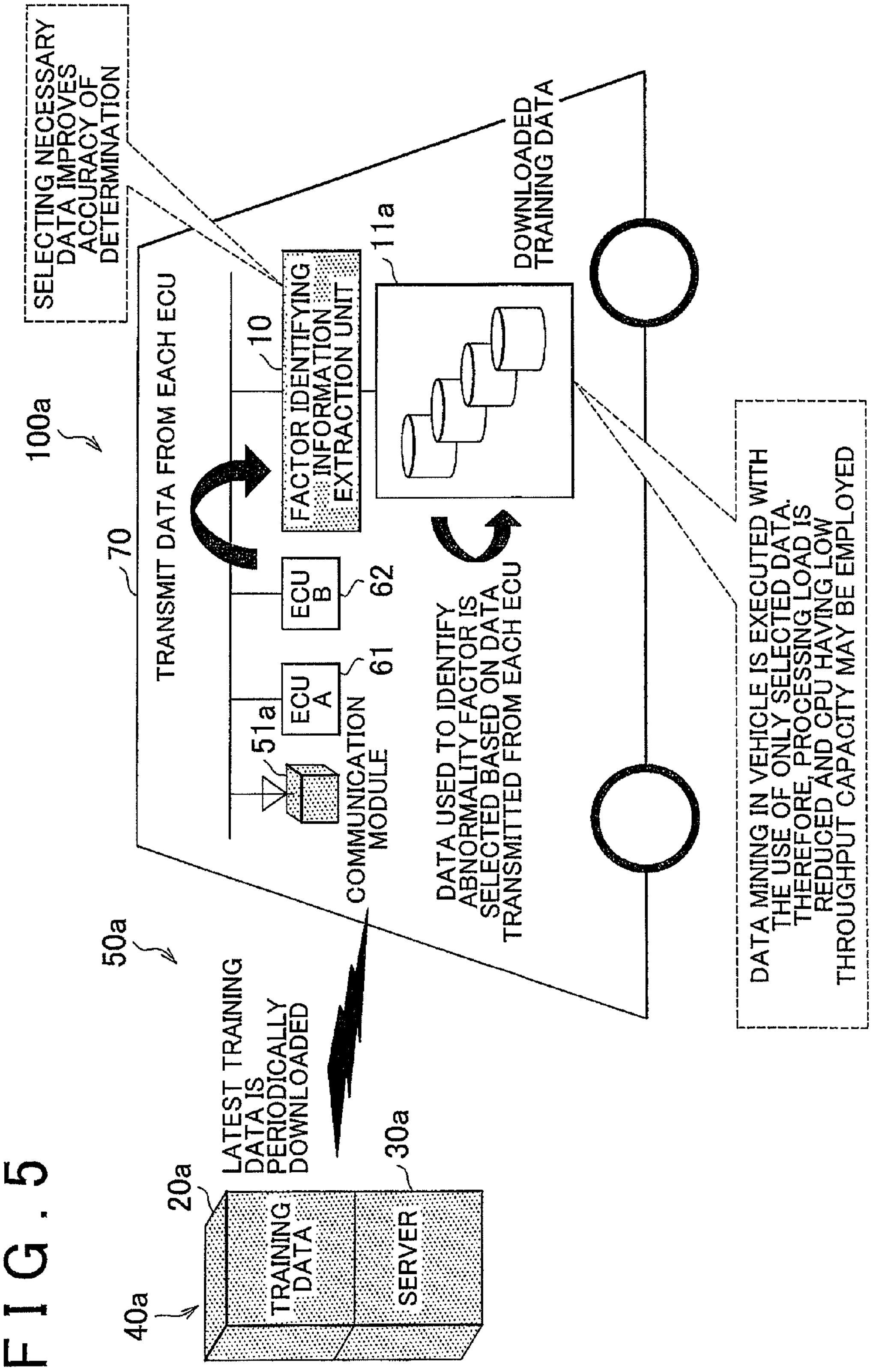
FIG. 5 is a view showing an abnormality analysis system for a vehicle according to a modification of the embodiment of the invention, which has factor identifying information data to which the training data can be downloaded.

Next, an abnormality analysis system 100*a* for a vehicle according to a modification of the embodiment of the invention will be described with reference to FIG. 5. According to the modification, the above-described training data stored in the database 20 is downloaded to factor identifying information data 11*a* of the factor identifying information extraction unit 10 in the vehicle. FIG. 5 is a view showing the abnormality analysis system 100*a* for a vehicle according to the modification, which has the factor identifying information data 11*a* to which the training data can be downloaded As shown in FIG. 5, the abnormality analysis system 100*a* according to the modification includes the factor identifying information extraction unit 10 provided in the vehicle 70, a communication module 51*a* that is a vehicle-side communication unit, and a vehicle exterior diagnostic unit 40*a*. The vehicle 70 includes the factor identifying information extraction unit 10, the factor identifying information data 11*a*, the ECU 60 and the communication module 51*a*. The vehicle exterior diagnostic unit 40*a* includes a database 20*a* in which the training data is stored, and a server 30*a* that has the function of the abnormality cause estimation unit 30.

In the abnormality analysis system 100*a* for a vehicle according to the modification in FIG. 5, the communication module 51*a* downloads the periodically updated training data from the server 30*a* via a network 50*a*. The server 30*a* is a computer that includes the abnormality cause estimation unit 30. The server 30*a* accesses the database 20*a* that contains the training data, analyzes an abnormality, adds necessary data to the training data, and deletes unnecessary data from the training data.

In the vehicle 70, the training data is periodically downloaded from the server 30*a* with the use of the communication module 51*a* to update the training data in the vehicle 70. Because a tremendous amount of data is stored in the database 20*a*, the communication module 51*a* may download only the training data that is selected for the extraction of the factor identifying information executed by the factor identifying information extraction unit 10.

The other components are the same as those described above with reference to FIGS. 1 to 4. The ECU 60 may be formed of multiple ECUs, for example, the ECU 61 and the ECU 62 that are different in the position in the vehicle or the types of control values stored therein. When an abnormality of the vehicle is detected, the data on the vehicle state values is transmitted from each of the ECU 61 and 62 to the factor identifying information extraction unit 10. The factor identifying information extraction unit 10 identifies the factor of the abnormality based on the detected vehicle state values with the use of the updated factor identifying information data 11*a*, and extracts the factor identifying information corresponding to the identified factor. The factor identifying information extracted by the factor identifying information extraction unit 10 is transmitted to the server 30*a* of the vehicle exterior diagnostic unit 40*a* via the network 50*a* with the use of the communication module 51*a*.

In the vehicle exterior diagnostic unit 40*a*, the server 30*a* that includes the abnormality factor estimation unit analyzes the cause of the abnormality in detail by executing data mining with the use of a portion of the training data in the database 20*a*, which is identified based on the factor identifying information. As described above, the measures that will be taken differ depending on whether the abnormality is a temporary abnormality or a malfunction.

In the modification of the embodiment of the invention shown in FIG. 5, the network 50*a* is used. This makes it possible to extract the factor identifying information with the use of the latest training data in the vehicle 70.

Figure 6:
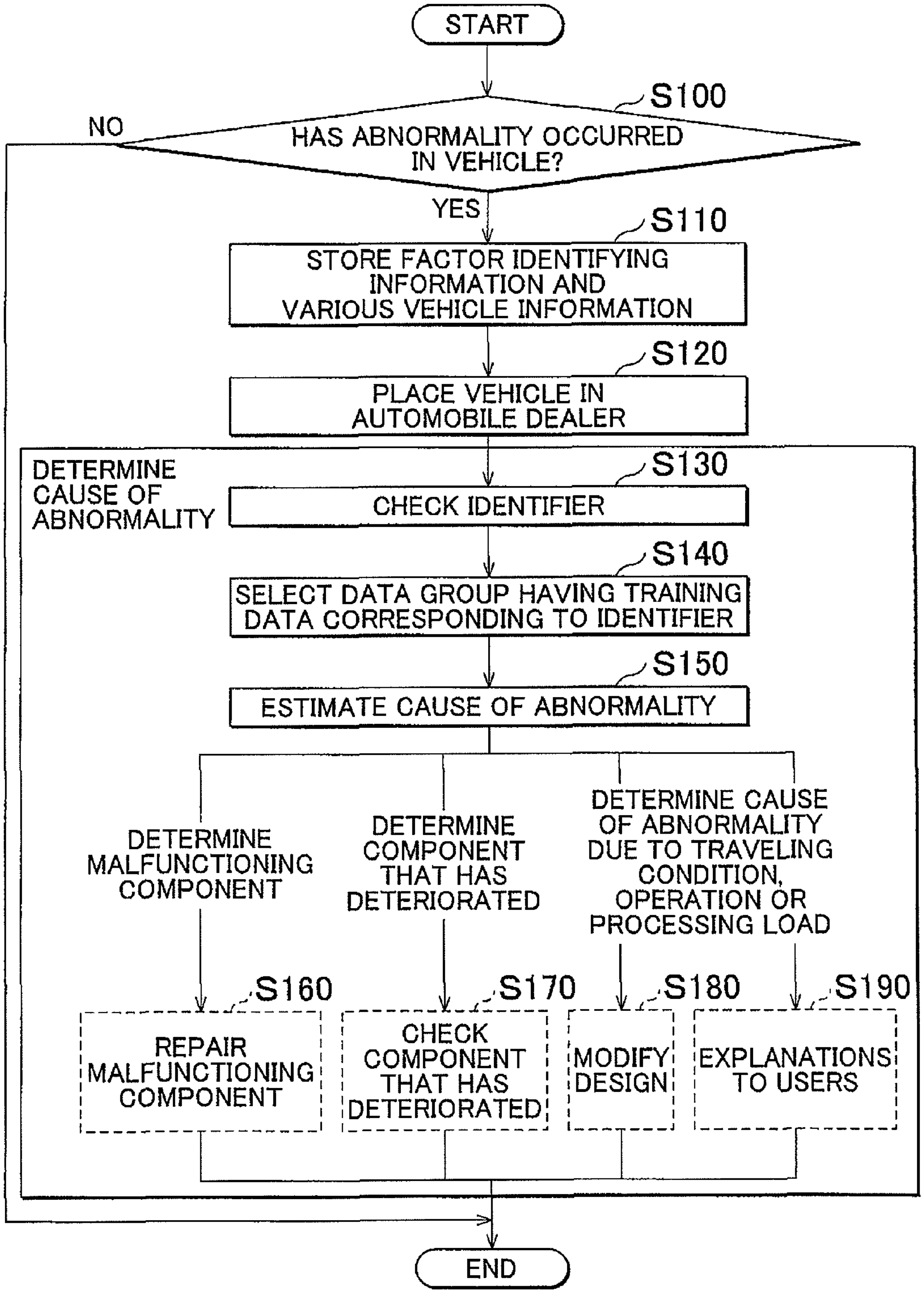
FIG. 6 is a flowchart for an abnormality analysis method for a vehicle according to the embodiment of the invention.

Next, a flowchart for an abnormality analysis method for a vehicle that is executed with the use of the abnormality analysis system 100 according to the embodiment of the invention or the abnormality analysis system 100*a* according to the modification of the embodiment of the invention will be described with reference to FIG. 6. FIG. 6 is a view showing the flowchart for the abnormality analysis method according to the embodiment of the invention.

In step (hereinafter, referred to as "S") 100, it is determined whether an abnormality has occurred in the vehicle 70. Whether an abnormality has occurred may be determined, for example, based on the values detected by the various sensors, as described above with reference to FIG. 1. If it is determined that an abnormality has not occurred in the vehicle 70, the routine ends, and S100 is executed again. On the other hand, if it is determined in S100 that an abnormality has occurred, S110 is executed.

In S110, the factor identifying information is extracted. More specifically, the factor identifying information on the factor of the abnormality is extracted by the factor identifying information extraction unit 10 based on the various vehicle information recorded by each ECU 60 at the time of occurrence of the abnormality, and is recorded along with the vehicle state values contained in the various vehicle information.

In S120, the vehicle 70 is placed in an automobile dealer. Thus, it is possible to analyze the cause of the abnormality based on the factor identifying information extracted by the factor identifying information extraction unit 10 and the vehicle state values.

In S130, the factor identifying information extracted by the factor identifying information extraction unit 10 is transmitted from the vehicle 70 to the vehicle exterior diagnostic unit 40, and the vehicle exterior diagnostic unit 40 checks the identifier of the received factor identifying information, which is one of F1 to F5 and Fx. The vehicle exterior diagnostic unit 40 includes the database 20 that has the data groups in which the causes of abnormalities and the vehicle state values at the time of occurrence of the abnormalities are stored. The abnormality cause estimation unit 30 in the vehicle exterior diagnostic unit 40 may identify the identifier of the received factor identifying information.

In S140, the abnormality cause estimation unit 30 selects one of the data groups 21 to 26 in the database 20, which contains the training data that corresponds to the identifier selected from among the identifier F1 to F5 and Fx. In this step, the data group that corresponds to the extracted factor identifying information is selected from the database 20 that contains a plurality of data groups 21 to 26.

In S150, the abnormality cause estimation unit 30 estimates the cause of the abnormality with the use of the data group selected from among the data groups 21 to 26. The abnormality analysis for estimating the cause of the abnormality may be executed by, for example, data mining. The process for determining the cause of the abnormality is executed with the use of only the data group selected from among the groups 21 to 26. When S150 is completed, the routine executed by the abnormality analysis system 100 according to the embodiment of the invention or the abnormality analysis system 100*a* according to the modification of the embodiment of the invention is completed. However, after S150 is completed, one of S160 to S190 is selected depending on the result of estimation of the cause of the abnormality, and the selected step is executed.

If it is estimated in S150 that the cause of the abnormality is a malfunction of a component, S160 is executed. In S160, the component that is determined to be a malfunction component is repaired. Thus, it is possible to eliminate the abnormality due to the malfunction.

If it is estimated in S150 that the cause of the abnormality is deterioration of a component, S170 is executed. In S170, the component that is estimated to be deteriorated is checked. Depending on the degree of deterioration of the component, the component should be replaced or adjusted.

If it is estimated in S150 that the abnormality is a temporary abnormality due to the traveling state, an erroneous operation performed by the user or an excessive increase in the processing load, S180 or S190 is selected based on the cause of the abnormality and the selected step is executed.

In S180, the design is modified. When it is considered that the abnormality is caused due to a problem in design, the design is modified to improve the usability so that an abnormality is unlikely to occur.

In S190, explanations to the user are made. When a temporary abnormality has occurred due to an erroneous operation performed by the user or due to sever traveling state or when the processing load exceeds the limit, the manner in which the user uses the vehicle may be inappropriate and the user should deepen his/her understanding of how to use the vehicle. In such a case, explanations to the user should be made to call his/her attention so that an abnormality does not occur.

In the flowchart, S100 to S150 are included in the routine executed by the abnormality analysis system 100 according to the embodiment of the invention or the abnormality analysis system 100*a* according to the modification of the embodiment of the invention, and S160 to S190 are examples of additional steps. The abnormality analysis method for a vehicle according to the embodiment of the invention need to include S110 and S130 to S150 from among S100 to S190. In the example shown in the flowchart, the vehicle 70 is placed in the automobile dealer and the abnormality is analyzed in detail by the vehicle exterior diagnostic unit 40. Alternatively, the abnormality may be analyzed at a control center with the use of the communication unit 50.

While the invention has been described with reference to the example embodiment thereof, it is to be understood that the invention is not limited to the example embodiment. To the contrary, the invention is intended to cover various modifications and equivalent arrangements. In addition, while the various elements of the example embodiment are shown in various combinations and configurations, which are examples, other combinations and configurations, including more, less or only a single element, are also within the scope of the invention.

What is claimed is:

1. An abnormality analysis system for a vehicle that estimates a cause of an abnormality of the vehicle when an abnormality of the vehicle is detected based on a vehicle state value that indicates a state of the vehicle, comprising:

a factor identifying information extraction unit that extracts factor identifying information which is used to identify a factor of the abnormality based on the vehicle state value;

a database that contains data groups which correspond to respective categories of the factor identifying information and which store causes of abnormalities and vehicle state values at the time of occurrence of the abnormalities; and an abnormality cause estimation unit that executes a process for selecting the data group that corresponds to the category of the factor identifying information extracted by the factor identifying information extraction unit, and estimating the cause of the abnormality of the vehicle with the use of the vehicle state value at the time of the occurrence of the abnormality in the selected data group.

2. The abnormality analysis system according to claim 1, wherein:

the factor identifying information extraction unit is mounted in the vehicle; and the database and the abnormality cause estimation unit are formed as a vehicle exterior diagnostic unit and provided outside of the vehicle.

3. The abnormality analysis system according to claim 2, wherein when the cause of the abnormality of the vehicle is estimated, the factor identifying information extraction unit and the abnormality cause estimation unit are connected to each other via a connecting wire.

4. The abnormality analysis system according to claim 2, further comprising:

a communication unit that transmits the factor identifying information extracted by the factor identifying information extraction unit to the vehicle exterior diagnostic unit.

5. The abnormality analysis system according to claim 2, wherein each of the data groups in the database contains training data.

6. The abnormality analysis system according to claim 5, wherein:

a communication module is provided in the vehicle; and the training data is downloaded to the factor identifying information extraction unit by the communication module.

7. The abnormality analysis system according to claim 6, wherein:

a portion of the training data, which is used for extraction of the factor identifying information executed by the factor identifying information extraction unit, is selected; and the selected portion of the training data is downloaded to the factor identifying information extraction unit.

8. The abnormality analysis system according to claim 1, wherein the categories of the factor identifying information include a category of information on a temporary abnormality that is neither a component malfunction nor a system malfunction.

9. The abnormality analysis system according to claim 8, wherein:

the factor identifying information extraction unit executes a process for extracting the factor identifying information on the temporary abnormality before extracting the factor identifying information on the component malfunction or the system malfunction; and the factor identifying information extraction unit extracts the vehicle state value that is not classified in the category of the factor identifying information on the temporary abnormality, as the factor identifying information on the component malfunction or the system malfunction.

10. The abnormality analysis system according to claim 8, wherein:

the factor identifying information extraction unit executes a process for extracting the factor identifying information on the temporary abnormality;

when the factor identifying information is extracted as a result of the process for extracting the factor identifying information on the temporary abnormality, the factor identifying information extraction unit determines that the abnormality is the temporary abnormality; and when no factor identifying information is extracted as a result of the process for extracting the factor identifying information on the temporary abnormality, the factor identifying information extraction unit determines that the factor of the abnormality is the component malfunction or the system malfunction.

11. The abnormality analysis system according to claim 10, wherein a priority that is given to the process for estimating the cause of the abnormality when the factor of the abnormality is the component malfunction or the system malfunction differs from a priority that is given to the process for estimating the cause of the abnormality when the abnormality is the temporary abnormality.

12. The abnormality analysis system according to claim 11, wherein when the factor of the abnormality is the component malfunction or the system malfunction, a high priority is given to the process for estimating the cause of the abnormality.

13. The abnormality analysis system according to claim 1, wherein each of the data groups in the database contains training data.

14. An abnormality analysis method for a vehicle for estimating a cause of an abnormality of the vehicle when an abnormality of the vehicle is detected based on a vehicle state value that indicates a state of the vehicle, comprising:

extracting, by one or more processors, factor identifying information that is used to identify a factor of the abnormality based on the vehicle state value;

selecting, by the one or more processors, from a database that contains data groups which correspond to respective categories of the factor identifying information and which store causes of abnormalities and vehicle state values at the time of occurrence of the abnormalities, the data group that corresponds to the category of the extracted factor identifying information; and estimating, by the one or more processors, the cause of the abnormality of the vehicle with use of the vehicle state value at the time of the occurrence of the abnormality in the selected data group.

* * * * *